US012589318B2

(12) United States Patent
Liu

(10) Patent No.: US 12,589,318 B2
(45) Date of Patent: Mar. 31, 2026

(54) GAME STATION FOR PS5 CONSOLE

(71) Applicant: Guangzhou Zhongtianxin Electronic Technology Co., Ltd, Guangzhou (CN)

(72) Inventor: Zheng Liu, Yiyang (CN)

(73) Assignee: Guangzhou Zhongtianxin Electronic Technology Co., Ltd, Guangzhou (CN)

( * ) Notice: Subject to any disclaimer, the term of this patent is extended or adjusted under 35 U.S.C. 154(b) by 248 days.

(21) Appl. No.: 18/507,229

(22) Filed: Nov. 13, 2023

(65) Prior Publication Data

US 2025/0135362 A1     May 1, 2025

(30) Foreign Application Priority Data

Oct. 30, 2023    (CN) .......................... 202322922112.X

(51) Int. Cl.
A63F 13/98          (2014.01)
(52) U.S. Cl.
CPC ..................................... A63F 13/98 (2014.09)
(58) Field of Classification Search
None
See application file for complete search history.

(56) References Cited

U.S. PATENT DOCUMENTS

2008/0150480 A1 *   6/2008   Navid ...................... A63F 13/90
                                                        320/113
2011/0266231 A1 *  11/2011   Tsunezumi .............. A63F 13/23
                                                        439/577
2012/0172116 A1 *   7/2012   Mercier .................. A63F 13/26
                                                        463/30

2013/0221923 A1 *   8/2013   Robertson ........... H01M 50/247
                                                        320/112
(Continued)

FOREIGN PATENT DOCUMENTS

CA          2639446 A1 *   3/2009   .............. H02J 50/90
CN       213628654 U       7/2021
(Continued)

OTHER PUBLICATIONS

Rysker, PS5/Slim/Pro Stand for Disc & Digital Console, https://www.amazon.com/dp/BOCLV1YDYS?tag=exforexbroker-20&th=1&linkId=2e9ae6fb87b1682ceb20cc973530a13e&ref_=as_li_ss_tl&geniuslink=true , Oct. 26, 2023, pp. 1-6 and embedded videos (Year: 2023).*

(Continued)

*Primary Examiner* — Tramar Harper
(74) *Attorney, Agent, or Firm* — JEEN IP LAW, LLC

(57)          ABSTRACT

The present utility model belongs to the technical field of gaming accessories, specifically a station for a game console. The station includes a base with an upper surface where a first placement position and a second placement position are located. The first placement position is designed for placing the game controller, while the second placement position is for placing the console. The base is equipped with slider slots and slider blocks at the first placement position, and the slider blocks slide along the horizontal plane within the slider slots. The slider blocks are equipped with charging interfaces that extend from the slider slots. The charging interfaces are used to connect to the charging ports of the game controller. The present application has the effect of reducing the production cost of the station for a game console.

5 Claims, 3 Drawing Sheets

(56)                    References Cited

U.S. PATENT DOCUMENTS

| | | | | |
|---|---|---|---|---|
| 2014/0235359 A1* | 8/2014 | Navid | .................. | H02J 7/0013 463/47 |
| 2016/0141901 A1* | 5/2016 | Navid | .................... | A63F 13/98 320/108 |
| 2018/0076648 A1* | 3/2018 | Kumar | .................... | A63F 13/98 |
| 2020/0335987 A1* | 10/2020 | Zheng | .................. | H02J 7/0044 |
| 2023/0201728 A1* | 6/2023 | Fu | ........................... | A63F 13/98 463/47 |
| 2024/0157258 A1* | 5/2024 | Maker | ..................... | A63F 13/98 |
| 2025/0079858 A1* | 3/2025 | Liu | ......................... | A63F 13/98 |
| 2025/0242267 A1* | 7/2025 | Liu | ....................... | H02J 7/0042 |

FOREIGN PATENT DOCUMENTS

| | | | | |
|---|---|---|---|---|
| CN | 213720578 U | 7/2021 | | |
| CN | 214072320 U | 8/2021 | | |
| DE | 202011002922 U1 * | 5/2011 | ........... | H02J 7/0045 |
| EP | 3163709 A1 * | 5/2017 | ........... | H02J 7/0044 |
| TW | M373228 U * | 2/2010 | | |

OTHER PUBLICATIONS

PS5_Slim_Pro Stand for Disc & Digital Console (Year: 2023).*

* cited by examiner

GAME STATION FOR PS5 CONSOLE

CROSS-REFERENCE TO RELATED APPLICATIONS

The application claims priority to Chinese patent application No. 202322922112X, filed on Oct. 30, 2023, the entire contents of which are incorporated herein by reference.

TECHNICAL FIELD

The present utility model relates to the technical field of gaming accessories, specifically a station for a game console.

BACKGROUND

As we all know, Home video game console, commonly referred to as home console, also known as home video console, console, video game console, etc., is an electronic device designed for home entertainment. Home video game console is a type of electronic game console that differs from arcade game console and handheld game console, etc., the home video game console usually uses a TV screen or a computer display screen as a display, and uses a special game controller for control.

In terms of a game console, the related technology generally includes three parts: the station, the controller, and the console. The controller is set two, two controllers are set on the base, at the same time the base is set with charging interfaces for two controllers charging, and the base is also set with a placement position for the console to place. Currently, a controller includes both old and new versions, while the console also includes both old and new versions, so there are bases suitable for different consoles and controllers respectively. The appearance of the two versions of controllers differs slightly, and their charging ports are parallel and similarly located.

Regarding the mentioned technical solution, there is a drawback in the production cost of a game console station due to the different charging port positions on the old and new controllers. This requires the production of two different stations to accommodate the placement of both controller types.

SUMMARY

In order to make up for the shortcomings of the above prior art, this application proposes a station for a game console.

The present utility model adopts the following technical solutions to solve the technical problems:

A station for a game console comprises a base. The station includes a base with an upper surface where a first placement position and a second placement position are located. The first placement position is designed for placing the game controller, while the second placement position is for placing the console. The base is equipped with slider slots and slider blocks at the first placement position, and the slider blocks slide along the horizontal plane within the slider slots. The slider blocks are equipped with charging interfaces that extend from the slider slots. The charging interfaces are used to connect to the charging ports of the game controller.

By adopting the above technical solution, when it is necessary to charge the controller, the slider block in the slider slot is moved according to the different charging ports of the new and old controllers. This positions the charging port of the charging interface corresponding to the controller that needs to be charged. This design allows for the integration of the charging parts of the new and old controllers by changing the position of the charging interface based on the different controllers. Therefore, the same station can be compatible with both new and old controllers, thus helping to reduce the production cost of the station.

Preferably, the base is equipped with locating slots at the first placement position, and the locating slots are used for placing the shoulder portion of the game controller.

By adopting the above technical solution, due to the presence of the locating slot, when charging the controller, the controller's shoulder can be inserted into the locating slot. Through the side walls of the locating slot, the position of the controller is limited, thereby minimizing the risk of vibration from the base causing the controller to tilt and potentially damaging the charging interface.

Preferably, the second placement position includes a first placement slot and a second placement slot. The first placement slot is designated for placing the new console and the second placement slot is designated for placing the old console.

By adopting the above technical solution, due to the second placement position includes a first placement slot and a second placement slot, it is possible to place both the new and old versions of the gaming console on the base. This allows a gaming console station to be compatible with the placement of both new and old versions of the console, eliminating the need to produce separate stations for each version. As a result, it further helps to reduce the production cost of the station.

Preferably, the base is equipped with a screw hole position that corresponds to the console.

By adopting the above technical solution, when the gaming console is placed on the second placement position of the base, it can be secured more firmly by using a screw to tighten the nut slot on the console itself. This design ensures a more stable placement of the gaming console.

Preferably, the bottom of the first placement slot and the second placement slot are not on the same horizontal plane, so that when a new or old console is placed on the base, the bottom of the new and old console is at the same height.

By adopting the above technical solution, because the bottom of the first placement slot and the second placement slot are at different heights, when the new and old consoles are placed on the base and at the same height, the screw hole position on the base are equidistant from the bottoms of the new and old consoles. Therefore, whether it is a new or old console, only the same screw is needed for fixation.

Preferably, the base is provided with ventilation holes, and the ventilation holes correspond to the heat dissipation holes of the new and old consoles respectively.

By adopting the above technical solution, because the console's heat dissipation hole is located at the bottom, setting ventilation holes on the base allows heat generated by the console to dissipate when it is placed on the base. In addition, the ventilation holes are designed to correspond to the heat dissipation hole settings of both new and old consoles, which promotes better heat dissipation.

Preferably, the slider holes are arranged with markings around the side.

By adopting the above technical solution, the identification markings make it easy for users to choose the charging interface location based on the type of controller, which improves the convenience of using the base.

In summary, the present application includes at least one of the following beneficial technical effects:

1. When needing to charge the controller, the slider block in the slider slot is moved according to the different charging ports of the new and old controllers. This positions the charging port of the charging interface corresponding to the controller that needs to be charged. This design allows for the integration of the charging parts of the new and old controllers by changing the position of the charging interface based on the different controllers. Therefore, the same station can be compatible with both new and old controllers, thus helping to reduce the production cost of the station.

2. Due to the second placement position includes a first placement slot and a second placement slot, it is possible to place both the new and old versions of the gaming console on the base. This allows a gaming console station to be compatible with the placement of both new and old versions of the console, eliminating the need to produce separate stations for each version. As a result, it further helps to reduce the production cost of the station.

3. Due to the bottom of the first placement slot and the second placement slot are at different heights, when the new and old consoles are placed on the base and at the same height, the screw hole position on the base are equidistant from the bottoms of the new and old consoles. Therefore, whether it is a new or old console, only the same screw is needed for fixation.

BRIEF DESCRIPTION OF DRAWINGS

In order to explain more clearly the technical solutions in the embodiments of the present utility model or the prior art, a brief introduction of the accompanying drawings required in the description of the embodiment or the prior art will be given below. Apparently, the drawings described below are some, but not all, of the embodiments of the present utility model. To ordinary skill in the art, other accompanying drawings can be obtained based on these drawings without any inventive efforts.

Figure 1:
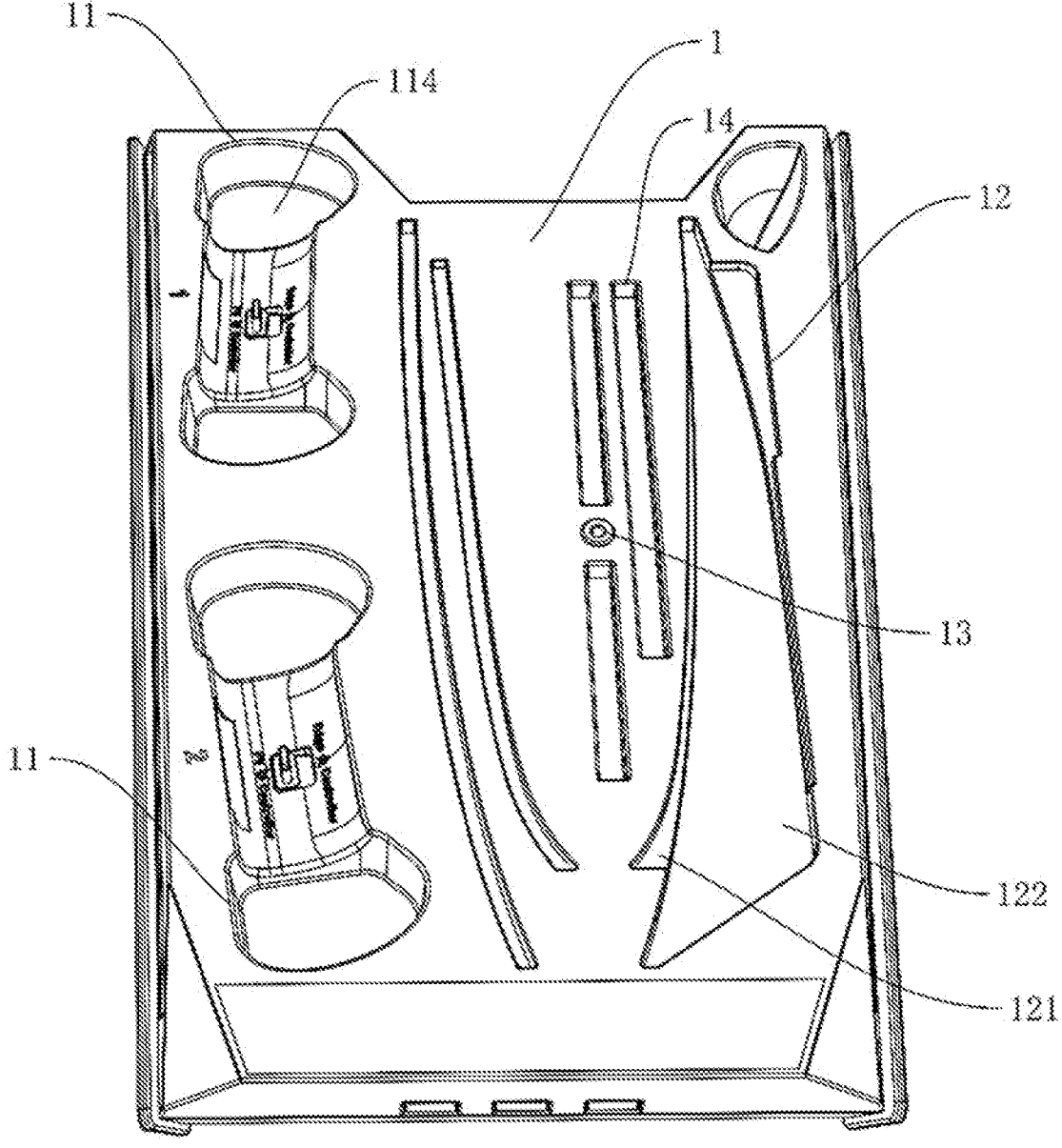
FIG. 1 is an overall schematic diagram of a gaming console station in the embodiments of the present application.

Description of the Drawing Reference Signs: 1, Base; 11, First Placement Position; 111, Slider Slot; 112, Slider Block; 113, Charging Interface; 114, Locating Slot; 12, Second Placement Position; 121, First Placement Slot; 122, Second Placement Slot; 13, Screw Hole Position; 14, Ventilation Hole.

DETAILED DESCRIPTION OF THE EMBODIMENTS

A clear and complete description of the technical solutions in the present utility model will be given below, in combination with the drawings corresponding to the embodiments of the present utility model. Apparently, the embodiments described below are some, but not all, of the embodiments of the present utility model. All of the other embodiments, obtained by those of ordinary skill in the art on the basis of the embodiments of the present utility model without any inventive efforts, fall into the protection scope of the present utility model.

Figure 2:
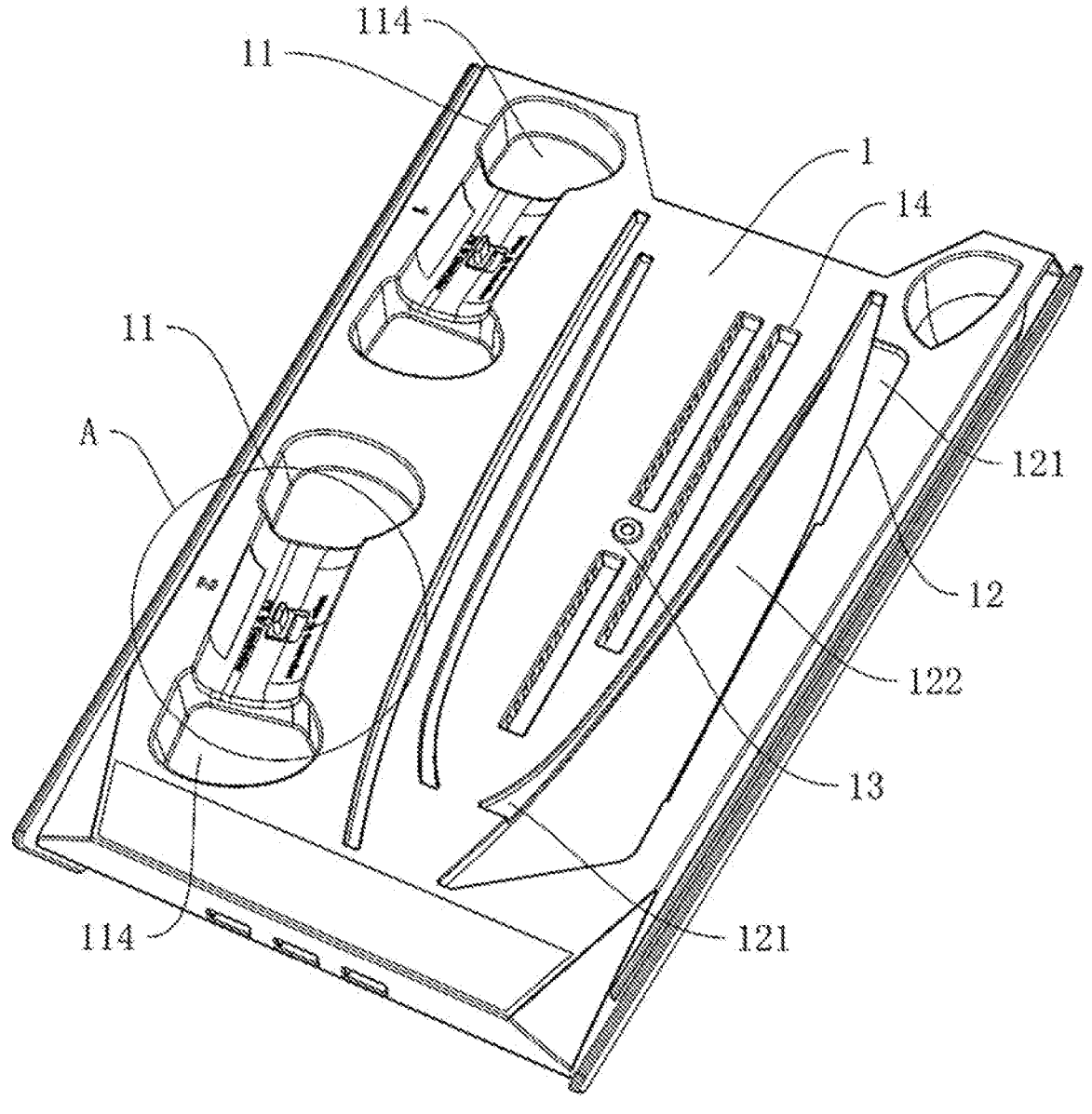
FIG. 2 is a schematic diagram showing the height difference between the first placement slot and the second placement slot in the embodiments of the present application.
Figure 3:
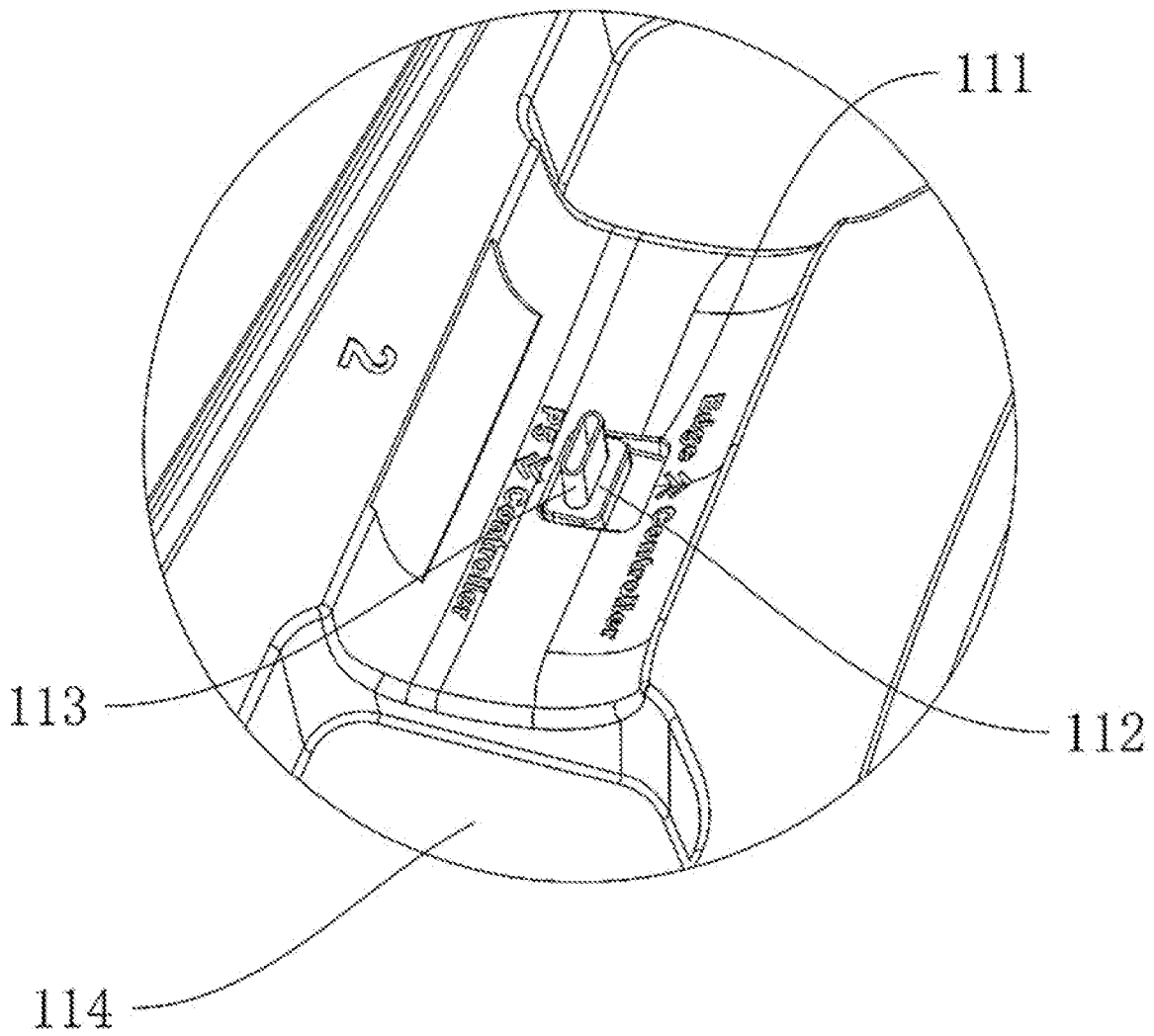
FIG. 3 is an enlarged view of area A in FIG. 2.

The embodiments of the present application discloses a station for a game console. Referring to FIGS. 1 to 3, a station for a game console comprises a base 1 with an upper surface where a first placement position 11 and a second placement 12 position are located. The first placement position 11 is intended for placing the controllers and has two positions for simultaneously placing two controllers. The second placement position 12 is intended for placing the console. The interior of the base 1 is equipped with circuit boards and other components. The length extension direction of the slider slot 111 is along the horizontal plane, and it is in communication with the interior of the base 1. The slider block 112 slides along the side wall of the slider slot 111 in a horizontal direction. On one side of the slider block 112 away from the base 1, a charging interface 113 is provided. Charging interface 113 is electrically connected to external charging device. Indeed, this design approach is due to the fact that a supports two different types of controllers, the new and old versions, namely the DualSense Edge controller and the DualSense controller. The charging ports for these two types of controllers are located in different positions on the same part of the controller, and are arranged parallel in the same position. Therefore, when charging different types of controllers, the charging interface 113 on the base 1 can be adjusted to move the slider block 112 to different positions in the slider slot 111, thereby changing the position of the charging interface 113, and integrating the charging interfaces 113 for the old and new types of controllers, which can help reduce the production cost of the station.

Referencing FIGS. 1 to 3, in order to provide greater stability for the controller when placed on the base 1, locating slots 114 are provided on the base 1, and there are four locating slots 114. The four locating slots 114 are arranged in a group of two, and the two locating slots 114 in a group are respectively arranged on the opposite sides of the slider slot 111, and the axis of the locating slots 114 is arranged vertically. The locating slots 114 are designed for the insertion of the shoulders of the controller, and the locating slots 114 are compatible with both the new and old versions of the controller. Therefore, when the controller is being charged, the side walls of the locating slots 114 restrict the movement of the controller's shoulders, preventing the controller from tilting or causing any damage to the charging interface 113.

Referring to FIGS. 1 to 3, because the console of a game console also has old and new types, in order to make the station compatible with the placement of new and old consoles, the second placement position 12 on the base 1 is equipped with the first placement slot 121 and the second placement slot 122. In the present embodiments, the first placement slot 121 is designed for the new version of the console, while the second placement slot 122 is designed for the old version of the console. The shapes of the first placement slot 121 and the second placement slot 122 are designed based on the contours of the bottom of each console version. As a result, the station can be made suitable for placing of the old and the new types of consoles, thus further reducing the production cost of the station.

Referring to FIGS. 1 to 3, screw hole positions 13 are provided on the base 1. The screw hole positions 13 are set at the second placement position 12 of the base 1. The axes of screw hole positions 13 are set vertically. External screws will be connected to the nut slots on the bottom of the console through the screw hole positions 13 to enhance the stability of the console placement. In order to reduce the number of screw hole positions 13, the first placement slot 121 and the second placement slot 122 are set at different horizontal positions, and the bottom of the second placement slot 122 is lower than the bottom of the first placement slot 121. When the new and old consoles are placed in the first placement slot 121 and the second placement slot 122 respectively, their nut slots on the bottom will be at the same horizontal level, and the nut slots of the new and old consoles will be at the same position. Therefore, only one screw hole position 13 is needed to connect the new and old consoles respectively.

Referring to FIGS. 1 to 3, the base 1 is equipped with ventilation holes 14 at the second placement position 12. The ventilation holes 14 have a rectangular cross-section when viewed from the opening direction. The ventilation holes 14 are arranged around the screw hole positions 13 and are designed to dissipate the heat generated by the console. Furthermore, the ventilation holes 14 are specifically designed to correspond to the heat emission holes of both the new and old console models, ensuring better heat dissipation.

Additionally, in the present embodiments, markings are provided on the peripheral side of the slider slot 111, and the charging interface 113 corresponds to the charging position of the new and old controllers at the markings, respectively, in order to be more convenient for the user to operate.

The principle of the embodiments of a station for a game console in the embodiments of the present application are as follows. When it is necessary to charge the controllers, the charging interface 113 is moved to different positions within the slider slot 111 depending on the type of controller, so that the position of the charging interface 113 corresponds to the position of the controller's charging port. This design allows for the integration of the charging ports for both new and old controllers. Additionally, a first placement slot 121 and a second placement slot 122 are provided on the second placement position 12 of the base 1. By using different shapes for the first placement slot 121 and the second placement slot 122, the second placement position 12 can accommodate the placement of both new and old consoles. This enables a game console station to be compatible with charging both new and old controllers, as well as accommodating the placement of new and old consoles, thereby helping to reduce the production cost of the station.

All the above are preferred embodiments of the present application, and the protection scope of the present application is not limited thereto. Therefore, any equivalent changes made based on the structure, shape, and principle of the present application should be included within the protection scope of the present application.

What is claimed is:

1. A station for a game console comprises a base having an upper surface, the upper surface of the base is equipped with a first placement position and a second placement position, the first placement position is for placing a game controller, and the second placement position is for placing the console, which is characterized in that: the base is equipped with slider slots and slider blocks at the first placement position, and the slider blocks slide along a horizontal plane within the slider slots; the slider blocks are equipped with charging interfaces that extend from the slider slots; the charging interfaces are used to connect to charging ports of the game controller;

the second placement position includes a first placement slot and a second placement slot, the bottom of the first placement slot and the second placement slot are not on the same horizontal plane, so that when a new console or an old console is placed on the base, the bottom of the new and old console is at the same height.

2. The station for a game console, as described in claim 1 is characterized in that the base is equipped with locating slots at the first placement position, and the locating slots are used for placing a shoulder portion of the game controller.

3. The station for a game console, as described in claim 1 is characterized in that the base is equipped with a screw hole position that corresponds to the console.

4. The station for a game console, as described in claim 1 is characterized in that the base is provided with ventilation holes, and the ventilation holes correspond to the heat dissipation holes of the new and old consoles respectively.

5. The station for a game console, as described in claim 1 is characterized in that the slider holes are arranged with markings around the side.

* * * * *